(12) United States Patent
Fukuchi et al.

(10) Patent No.: US 6,546,334 B1
(45) Date of Patent: Apr. 8, 2003

(54) CAR NAVIGATION MAP UPDATE SYSTEM AND CAR NAVIGATION TERMINAL

(75) Inventors: Yushi Fukuchi, Tokyo (JP); Masahiro Abukawa, Tokyo (JP); Heikan Izumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 52 days.

(21) Appl. No.: 09/604,970

(22) Filed: Jun. 28, 2000

(30) Foreign Application Priority Data

Jun. 29, 1999 (JP) .......................... 11-184300

(51) Int. Cl.[7] .................. G06G 7/78; G06F 12/00; G06F 17/24; H04B 7/185
(52) U.S. Cl. ................. 701/208; 342/357.13; 707/203; 707/511
(58) Field of Search ................. 701/23–26, 200–203, 701/207–210, 212; 340/988, 990–995; 342/357.13; 707/200, 203, 205, 511

(56) References Cited

U.S. PATENT DOCUMENTS

| | | | | |
|---|---|---|---|---|
| 5,968,109 A | * | 10/1999 | Israni et al. ................. | 701/208 |
| 6,075,467 A | * | 6/2000 | Ninagawa ................... | 340/995 |
| 6,154,152 A | * | 11/2000 | Ito .............................. | 340/988 |
| 6,230,098 B1 | * | 5/2001 | Ando et al. ................. | 701/208 |
| 6,259,509 B1 | * | 7/2001 | Tanaka et al. .............. | 455/515 |

FOREIGN PATENT DOCUMENTS

| | | |
|---|---|---|
| JP | A8271272 | 10/1996 |
| JP | A9090869 | 4/1997 |
| JP | A10040362 | 2/1998 |
| JP | A10133567 | 5/1998 |

* cited by examiner

*Primary Examiner*—Thu Nguyen

(57) ABSTRACT

A car navigation map update system includes map update data delivery equipment and one or more car navigation terminals. The map update data delivery equipment includes a map update data broadcasting section for broadcasting map update data by radio waves. Each car navigation terminal receives the broadcast map update data, stores the map update data in a map update data storing medium, and utilizes the map update data in connection with map information data prestored in a map data recording medium. This enables the terminals to collect latest map data using a receiver already installed in the car navigation terminals without adding a data transmitter, thereby solving a problem of a conventional car navigation system which requires a data transmitter installed in the car navigation terminal for sending a message to a host to obtain the map update data, and hence complicates the configuration and increases the cost of the system.

12 Claims, 7 Drawing Sheets

FIG.4
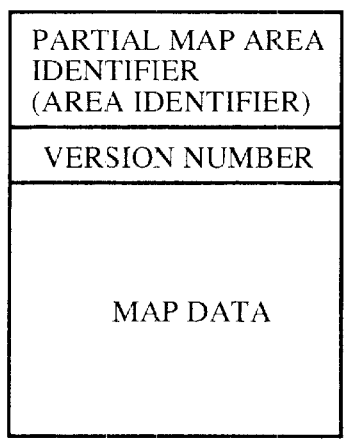
FIG.5
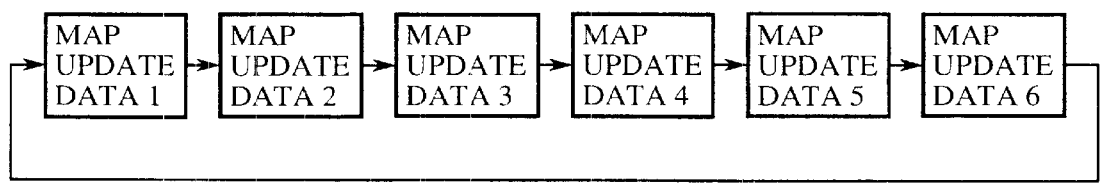
FIG.7
| AREA NUMBER | VERSION NUMBER |
|---|---|
| 2 | 2 |
| 5 | 3 |
| 9 | 3 |
| 22 | 3 |
| 30 | 2 |
| 33 | 2 |

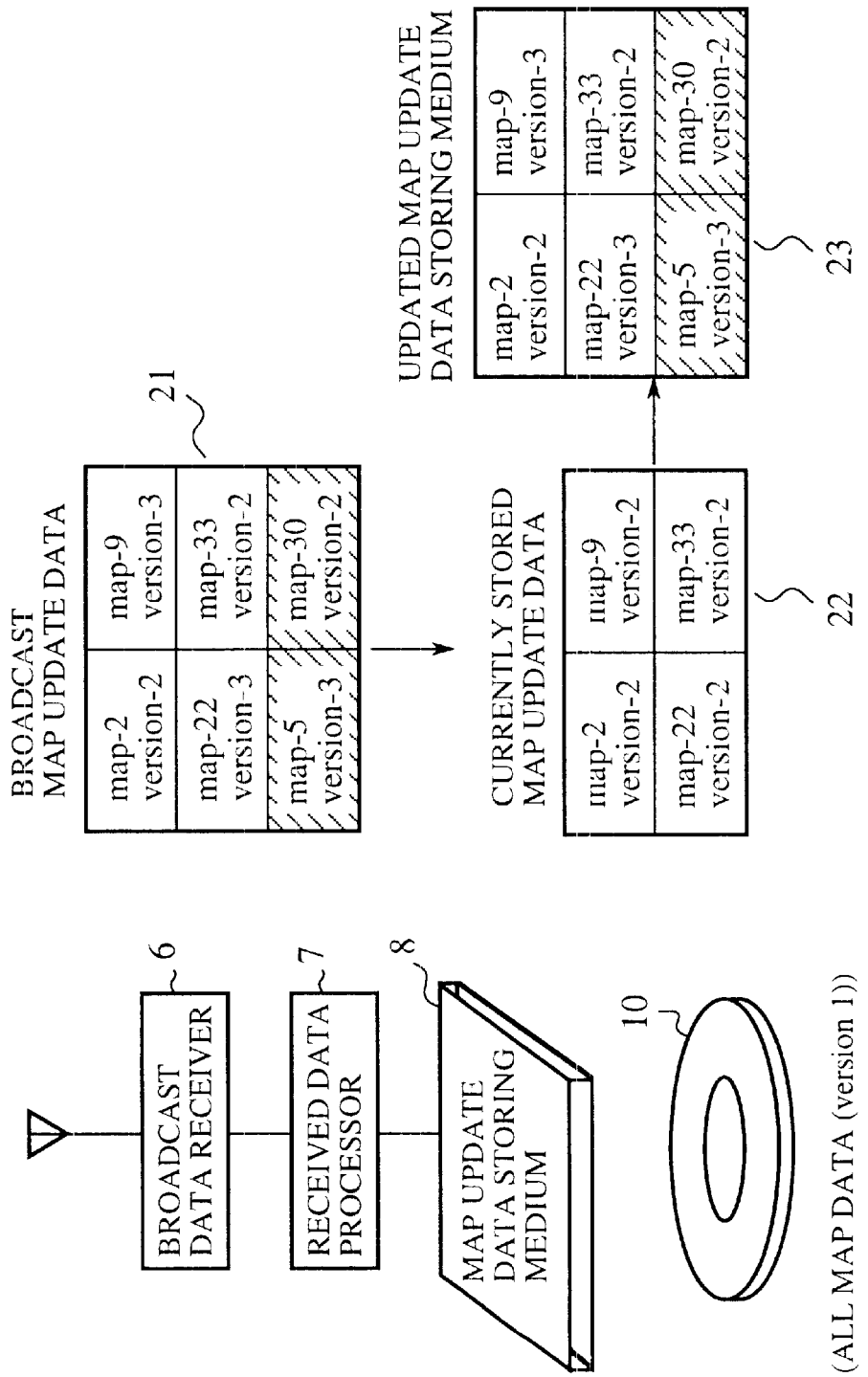

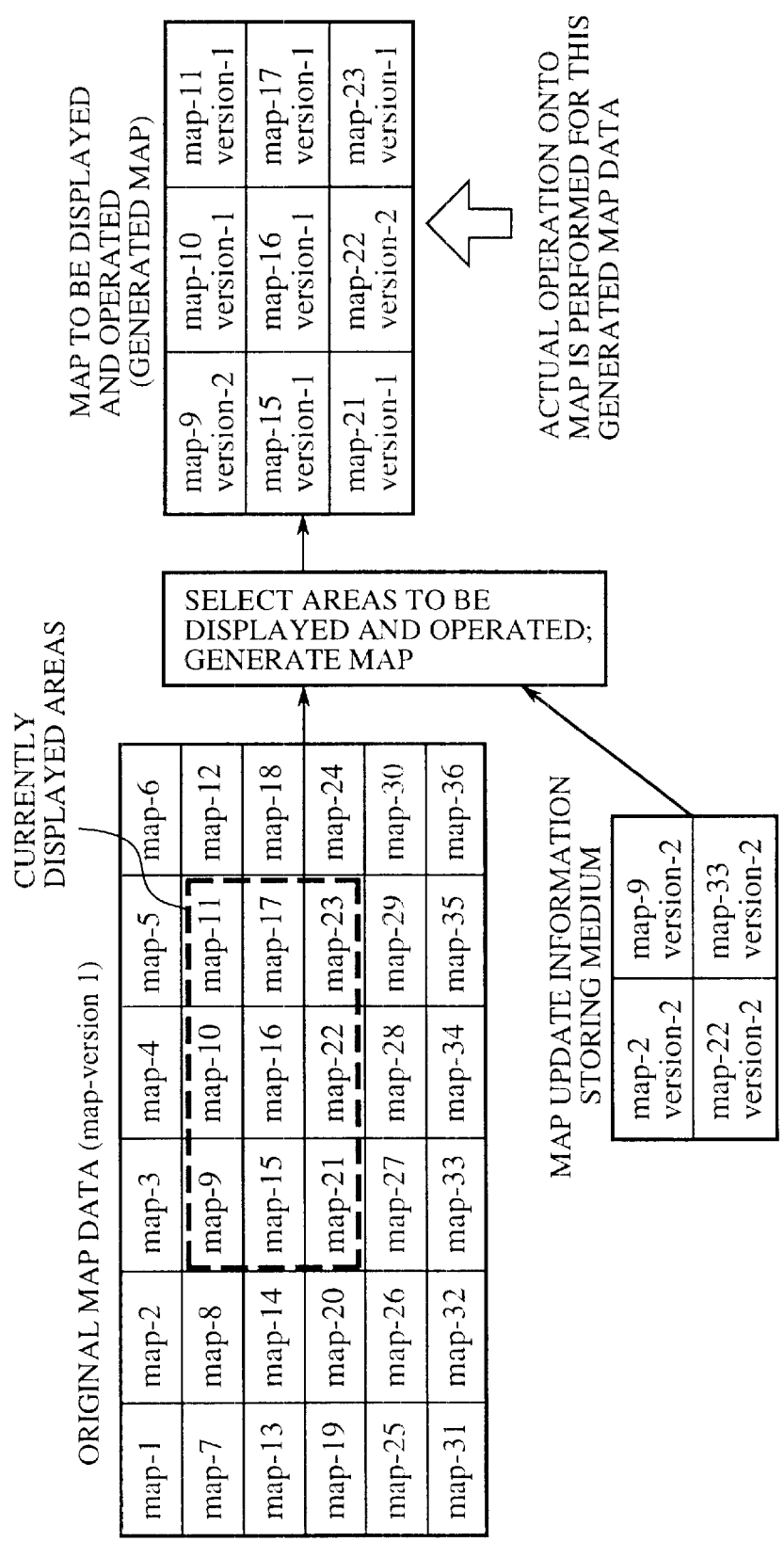

CAR NAVIGATION MAP UPDATE SYSTEM AND CAR NAVIGATION TERMINAL

BACKGROUND OF THE INVENTION

1. Field of the Invention

The present invention relates to a car navigation map update system for updating map data of a car navigation terminal.

2. Description of Related Art

Conventional car navigation electronic map systems usually store their map data in a read-only recording medium such as a CD-ROM, DVD-ROM or the like. Accordingly, to update their electronic map data, it is necessary to replace the recording medium itself that stores all the map data by a new version recording medium.

There is another type of map data update systems which do not replace their recording medium. For example, Japanese patent application laid-open No. 9-90869/1998 discloses a map associated information delivery system that employs, as a means for updating map data used by a car navigation device, a terminal (car navigation terminal) that calls up a host which keeps map update data, makes a request for desired map update data, and captures and utilizes the data as its own map update data.

With the foregoing configuration, the first type of the conventional car navigation map update systems present a problem when updating their electronic map data in that the recording medium itself must be replaced by a new version recording medium that stores all the map data.

The second type system that calls up the host has a problem of requiring a transmitter for sending the message to the host from the car navigation terminal, which complicates the system configuration and increases the cost.

SUMMARY OF THE INVENTION

The present invention is implemented to solve the foregoing problems. It is therefore an object of the present invention to provide a car navigation map update system and a car navigation terminal that can update map data by partially changing only updated map data without replacing all the map data, and that cat capture latest map data using only an already existing receiver installed in the car navigation system without using any additional transmitter.

According to a first aspect of the present invention, there is provided a car navigation map update system comprising: map update data delivery equipment including a map update data management section for managing a database containing rewritable map data, and a map update data broadcasting section for broadcasting by radio waves map update data rewritten by the map update data management section; and a car navigation terminal that receives the map update data broadcast by the map update data delivery equipment, stores the map update data in a map update data storing medium, and utilizes the map update data stored in the map update data storing medium in connection with map information data stored in a map data recording medium.

Here, the map update data management section and the car navigation terminal may form an entire map as an assemblage of partial map areas consisting of small subdivisions of map areas, and update the map on a partial map area basis by attaching an area identifier and a version number to each of the partial map areas.

The car navigation terminal may comprise a received data processor, wherein the received data processor may compare the area identifiers and version numbers of the received map update data with those of the map information data stored in the map data recording medium and with those of the map update data stored in the map update data storing medium; additionally store, when the received map update data includes a map update data block whose version number is newer than that of a corresponding map information data block stored in the map data recording medium, and whose area identifier disagrees with area identifiers of all map update data blocks on the map update data storing medium, the received map update data block into the map update data storing medium; and rewrite, when the received map update data includes a map update data block whose area identifier agrees with that of a map update data block stored in the map update data storing medium, and whose version number is newer than that of the map update data stored in the map update data storing medium, the map update data block on the map update data storing medium by the newly received map update data block.

The navigation terminal may comprise a map generator, wherein the map generator may retrieve map update data and map information data associated with designated map areas from the map update data storing medium and from the map data recording medium, and generate map data with replacing the map information data by the map update data in the designated map areas.

The map update data broadcasting section may broadcast the map update data repeatedly.

The car navigation map update system may further comprise a map update data update terminal, wherein the map update data storing medium may be removably attached to said car navigation terminal, and the map update data update terminal may rewrite the map update data on the map update data storing medium.

The map update data delivery equipment may comprise instead of the map update data broadcasting section an entire map data broadcasting section for broadcasting by radio waves all latest map data managed by the map data management section.

According to a second aspect of the present invention, there is provided a car navigation terminal comprising: a map data recorder for recording map data in advance; a receiver for receiving map update data broadcast by radio waves; a map update data storage for storing map update data; a received data processor that stores a map update data block in the received map update data when the map update data block is not stored in the map update data storage, and replaces, when a map update data block in the received map update data has its older version counterpart in the map update data storage, the older version counter part with the received map update data block; a map generator for combining map data recorded in the map data recorder with the map update data stored in the map update data storage; and a display unit for displaying combined map data.

BRIEF DESCRIPTION OF THE DRAWINGS

FIG. 4 is a schematic diagram showing a data structure of a map data block used in the car navigation map update system;

FIG. 5 is a diagram illustrating a broadcasting state of a map update data broadcasting section;

FIG. 6 is a diagram illustrating a write processing of received data into a map update data storing medium 8 by a received data processor 7;

FIG. 7 is a diagram illustrating an example of the map update data broadcast by the map update data broadcasting section;

FIG. 8 is a diagram illustrating a processing of a map generator; and

DETAILED DESCRIPTION OF THE PREFERRED EMBODIMENTS

The invention will now be described with reference to the accompanying drawings.

EMBODIMENT 1

Figure 1:
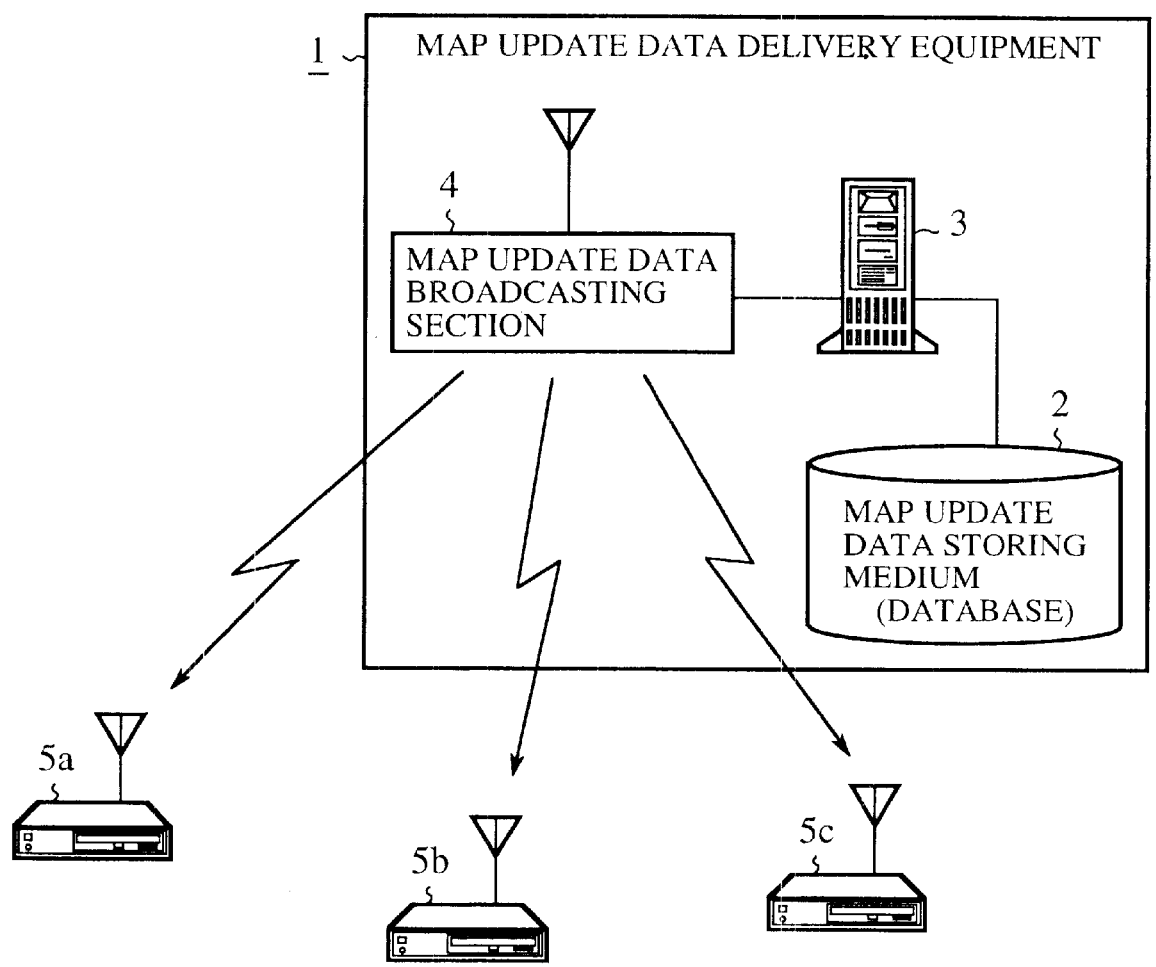
FIG. 1 is a diagram showing a configuration of a car navigation map update system of an embodiment 1 in accordance with the present invention.

FIG. 1 is a diagram showing a configuration of a car navigation map update system of an embodiment 1 in accordance with the present invention. In this figure, the reference numeral 1 designates map update data delivery equipment that comprises a map update data storing medium (database) 2; a map update data management server (map update data management section) 3 for managing the map data rewritable on the map update data storing medium 2; and a map update data broadcasting section 4 for broadcasting by radio waves the map update data rewritten by the map update data management server 3.

Reference numerals 5a–5c each designate a car navigation terminal for receiving the map update data sent from the map update data delivery equipment 1, and for utilizing the data as the car navigation map data by selecting and storing necessary map update data.

Figure 2:
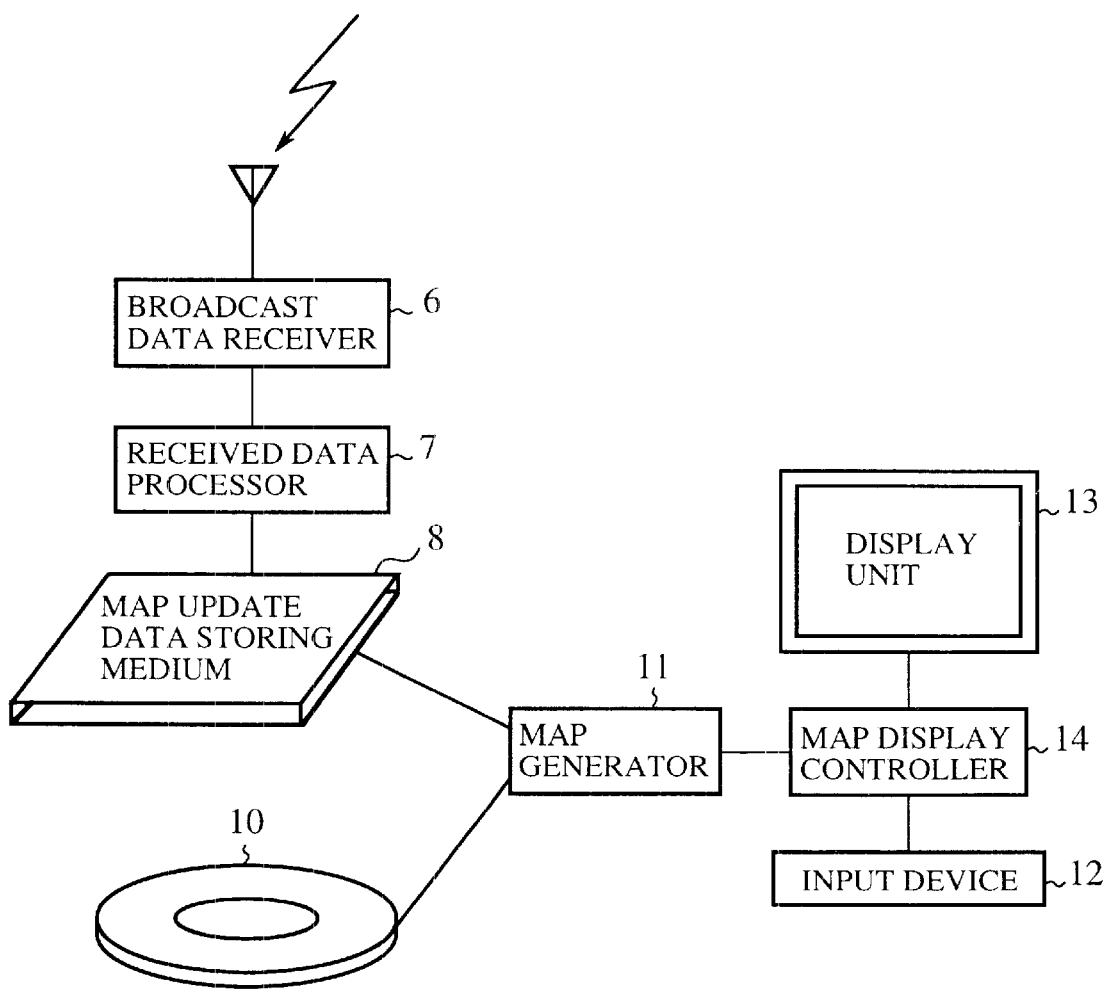
FIG. 2 is a block diagram showing a configuration of a car navigation terminal in FIG. 1.

FIG. 2 is a block diagram showing a configuration of the car navigation terminal 5a (5b or 5c). In this figure, the reference numeral 6 designates a broadcast data receiver for receiving the map update data sent from the map update data delivery equipment 1; and 7 designates a received data processor for extracting required map update data from the map update data received by the broadcast data receiver 6, and for storing the extracted data in a rewritable map update data storing medium 8. The reference numeral 10 designates a read-only map data recording medium such as a CD-ROM or DVD-ROM that records in advance map information data of all the map areas used by the car navigation terminal; and 11 designates a map generator that retrieves the map update data and map information data of the map areas designated by a map display controller 14 from the map update data storing medium 8 and map data recording medium 10, and generates the map data in the map areas by replacing the map information data by the map update data. The reference numeral 12 designates an input device for a user to enter information; 13 designates a display unit for displaying the map data of the map areas designated by the map display controller 14; and 14 designates the map display controller for designating the map areas to be handled by the map generator 11 in accordance with the instructions from the input device 12, for carrying out various operations using the generated map data, and for controlling the display of the generated map data on the display unit 13.

Figure 3:
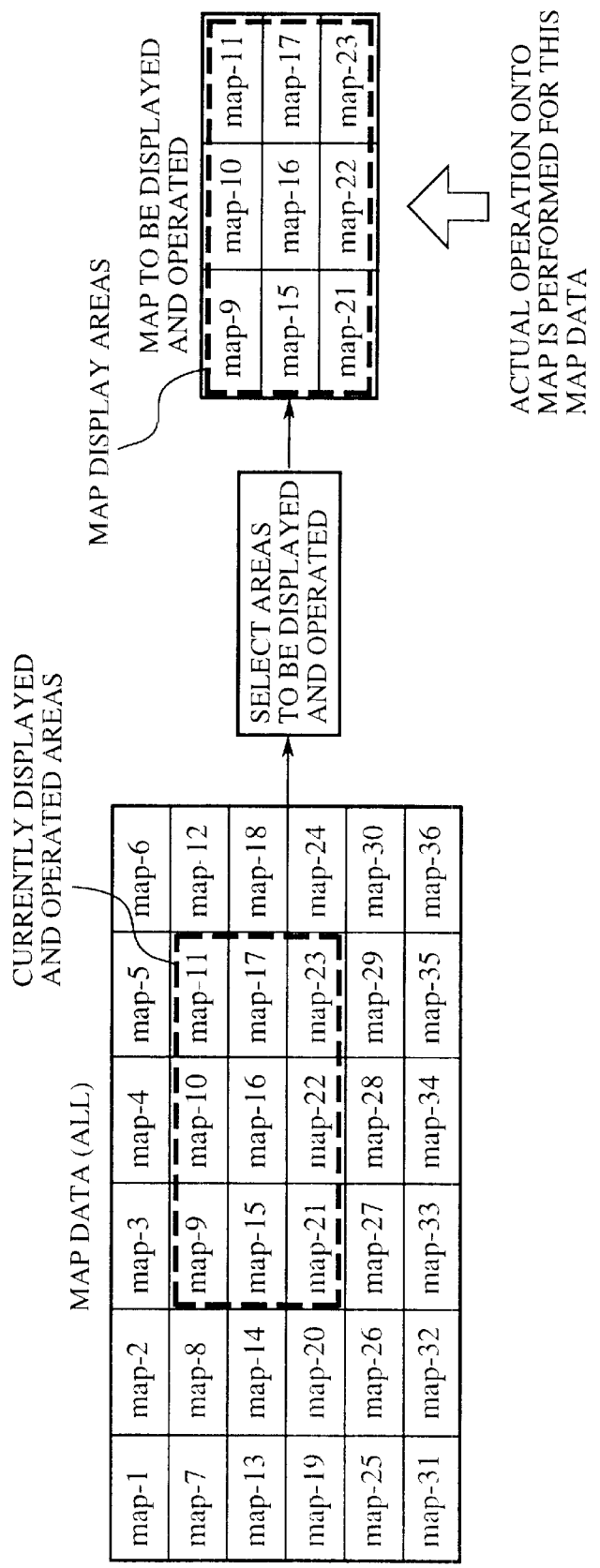
FIG. 3 is a schematic diagram showing a data structure of map data used in the car navigation map update system.

FIGS. 3 and 4 are diagrams showing data structure of the map data used by the car navigation map update system. As shown in FIG. 3, the entire map is divided into a plurality of partial map areas (map-1–map-36) in the map update data delivery equipment 1 and in the car navigation terminals 5a–5c, and when using the map, only partial map area data blocks of required areas are retrieved from the entire map and transferred to a work map area to be processed. FIG. 4 shows a data structure of a partial map area data block. It includes besides the map data a partial map area identifier (area identifier) for representing the block to which the partial map area belongs in the entire map, and the version number of the partial map area data block. The update of the map data is carried out on the partial map area basis, and a map update data block also has the structure as shown in FIG. 4.

Next, the operation of the present embodiment 1 will be described.

The map update data management server 3 in the map update data delivery equipment 1 manages the map update data in the map update data storing medium 2. When a new map update takes place, the map update data management server 3 checks whether or not the map update data in the same area is present in the map update data storing medium 2. When the data is not present, the map update data management server 3 adds the new map update data to the map update data storing medium 2, and when the data is present, it deletes that map update data from the map update data storing medium 2 and adds the new map update data.

The map update data broadcasting section 4 in the map update data delivery equipment 1 broadcasts, the map update data stored in the map update data storing medium 2 to deliver the new map update data.

In the present embodiment 1, since the delivery of the map update data is carried out by broadcast, it is unknown when the receiving terminals, the car navigation terminals 5a–5c, receive the map update data, and hence they cannot receive the map update data when they are located in bad radio conditions. Because of this, the map update data broadcasting section 4 repeatedly broadcasts the entire map update data stored in the map update data storing medium 2 so that the car navigation terminals 5a–5c can positively receive the data even though they failed once or twice.

FIG. 5 is a diagram showing a broadcasting state of the map update data broadcasting section 4. As shown in this figure, the map update data broadcasting section 4 cyclically broadcasts six pieces of the map update data stored in the map update data storing medium 2.

The car navigation terminals 5a–5c each receive with their broadcast data receivers 6 all the map update data broadcast from the map update data broadcasting section 4 in the map update data delivery equipment 1, and select with their received data processors 7 only necessary map update data and store the selected data in the map update data storing medium 8.

FIG. 6 is a diagram illustrating a storing processing by the received data processor 7 to the map update data storing medium 8. In this figure, the car navigation terminal 5a, for example, has the entire map data with a version number 1 in the map data recording medium 10, and stores in the map update data storing medium 8 the map update data of area numbers 2, 9, 22 and 33 with a version number 2.

FIG. 7 illustrates an example of the map update data broadcast by the map update data broadcasting section 4 in the map update data delivery equipment 1. The map update data broadcasting section 4 repeatedly broadcasts the map update data with the area numbers and version numbers as shown in FIG. 7.

The received data processor 7 carries out the following processing for the entire map update data received by the broadcast data receiver 6.

The received data processor 7 compares the area identifier and version number of each block of the received map update data with those of the map information data and map update data, which are stored in the map data recording medium 10 and map update data storing medium 8, respectively. Then, the received data processor 7 adds to the map update data storing medium 8 the received map update data blocks whose version numbers are newer than the version numbers of the map information data stored in the map data recording medium 10, and whose area identifiers differ from any of the identifiers of the map update data stored on the map update data storing medium 8. In addition, the received data processor 7 rewrites the map data blocks on the map update data storing medium 8 by the received map update data blocks when the received map update data blocks have area identifiers identical to those of the map update data blocks stored on the map update data storing medium 8, and have version numbers newer than those of the map update data blocks on the map update data storing medium 8.

In the example as shown in FIG. 6, among the broadcast map update data 21, the map update data blocks with area numbers 5 and 30 are added to the map update data storing medium 8 because they are newer in the version numbers than the map information data recorded in the map data recording medium 10, and are not included in the map update data 22 in the map update data storing medium 8. On the other hand, as for the received map update data blocks with area numbers 9 and 22, since they have the same area numbers as their counterparts on the map update data storing medium 8, and have a newer version number, they are written over the map update data blocks with area numbers 9 and 22 on the map update data storing medium 8. As for the received map update data blocks with area numbers 2 and 33, they are discarded because their counterparts are already stored in the map update data storing medium 8, and their version numbers are the same as those of the map update data blocks stored in map update data storing medium 8.

Thus, map update data 23 as shown in FIG. 6 is stored the map update data storing medium 8.

The display of the map on the car navigation terminal 5a is carried out as follows. Receiving an operation command from the input device 12, the map display controller 14 determines required map areas. The map generator 11 reads required map information data from the map data recording medium 10 storing the entire map information, and required map update data from the map update data storing medium 8 storing the map update data. Then, the map generator 11 generates revised map data by replacing old version map data blocks; in the desired map areas selected from the entire map data by the corresponding new map update data blocks included in the map update data, and displays the revised map data of the selected areas.

FIG. 8 is a diagram illustrating the processing of the map generator 11. It is an example in which the car navigation terminal 5a comprises the entire map, with version number 1 and map update data blocks of area numbers 2, 9, 22 and 33 with version number 2, and displays partial map data of area numbers 9, 10, 11, 15, 16, 17, 21, 22 and 23 in response to the command from a user.

In this case, the map generator 11 checks whether the map update data of the selected areas are, present in the map update data storing medium 8. In this case, since the area numbers 9 and 22 are included in the map update data of the selected areas, the map generator 11 reads the map information data blocks of the area numbers other than 9 and 22, that is, of the area numbers 10, 11, 15, 16, 17, 21 and 23 from the map data recording medium 10 storing the entire map data, and the map update data blocks of the area numbers 9 and 22 from the map update data storing medium 8, and combines them to produce the revised map of the selected areas.

As described above, the present embodiment 1 is configured as shown in FIGS. 1 and 2 such that the car navigation terminals 5a–5c each receive with the broadcast data receiver 6 the map update data broadcast from the map update data broadcasting section 4 in the map update data delivery equipment 1; select with the received data processor 7 only the required map update data to be stored in the map update data storing medium 8; and utilize the stored map update data. This offers an advantage of being able to complete the update of the map data by only updating the newly updated map data without replacing all the map data in the entire areas, and an advantage of being able to collect latest map data using only the existing broadcast data receiver 6 installed in the car navigation terminal without adding any data transmitter.

Furthermore, as shown in FIGS. 3 and 4, the present embodiment 1 is configured such that the entire map consists of a plurality of the partial map areas, each of which has the partial map area identifier for identifying the position in the entire map and the version number of the partial map area data block. This offers an advantage of being able to facilitate the update processing of the map update data in the map update data storing medium 2 by the map update data management server 3, and the update processing of the map update data in the map update data storing medium 8 by the received data processor 7, and an advantage of being able to facilitate the combining processing of the map information data in the map data recording medium 10 with the map update data in the map update data storing medium 8 by the map generator 11.

Moreover, since the present embodiment 1 is configured such that the map update data broadcasting section 4 continues to cyclically broadcast the map update data as shown in FIG. 5, it provides unlimited opportunities for the car navigation terminals 5a–5c to receive the data. This offers an advantage of being able to prevent the car navigation terminals 5a–5c from failing to receive the map update data because of bad radio conditions or inactive conditions of the terminals, thereby improving the reliability.

In addition, as shown in FIG. 6, the received data processor 7 is configured such that when a received map update data block has a version number newer than that of the corresponding map information data block stored in the map data recording medium 10, and has a partial map area identifier different from any of the map update data stored in the map update data storing medium 8, the received data processor 7 adds the received map update data block to the map update data storing medium 8; and when a received map update data has the same partial map area identifier as a map update data block on the map update data storing medium 8, but has a version number newer than the map update data block stored in the map update data storing medium 8, the received data processor 7 replaces that map update data block stored in the map update data storing medium 8 with the received map update data. This offers an advantage of enabling the map update data storing medium 8 to store the latest map update data for individual partial map areas.

Furthermore, as shown in FIG. 8, the present embodiment 1 is configured such that the map generator 11 retrieves the required map information data blocks from the map data recording medium 10 and the required map update data blocks from the map update data storing medium 8, and combines them in such a manner that the map information data blocks, which are included in the selected map areas and have corresponding map update data blocks on the map update data storing medium 8, are replaced by the corresponding map update data blocks. This offers an advantage of being able to generate the map information of the selected areas with taking account of the received latest map update data.

EMBODIMENT 2

Figure 9:
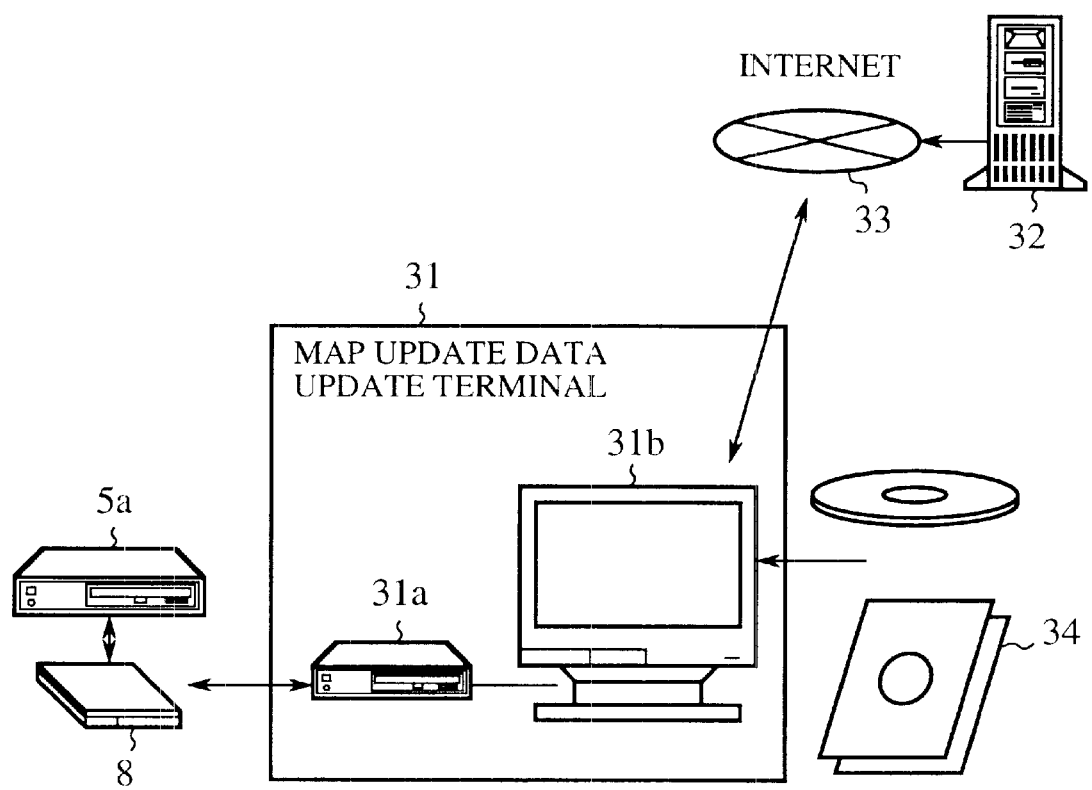
FIG. 9 is a diagram illustrating a rewrite processing of the map update data in the map update data storing medium by a map update data update terminal of an embodiment 2 in accordance with the present invention.

FIG. 9 is a diagram illustrating a rewrite operation of map update data on a map update data storing medium in a map update data update terminal of an embodiment 2 in accordance with the present invention. In this figure, the reference numeral 5a designates a car navigation terminal; and 8 designates a map update data storing medium which is removably attached to the car navigation terminal 5a.

The reference numeral 31 designates a map update data update terminal for rewriting the map update data on the map update data storing medium 8. The map update data update terminal 31 comprises a map update data storing medium PC interface 31a, and a personal computer 31b. The reference numeral 32 designates a map update data provider 32; 33 designates the Internet; and 34 designates a map update data recording medium.

Next, the operation of the present embodiment 2 will be described.

Although the foregoing embodiment 1 receives the map update data to be stored in the map update data storing medium 8 via broadcast waves, it can sometimes take a long time to receive all the map update data when the volume of the broadcast map update data is enormous. In view of this, as an auxiliary function, the map update data storing medium 8 in the car navigation terminal 5a is made detachable from and attachable to the car navigation terminal 5a, so that the external map update data update terminal 31 can rewrite the map update data on the map update data storing medium 8 using the map update data collected from the map update data provider 32 through the Internet 33, or from the map update data recording medium 34.

As described above, the present embodiment 2 is configured such that the map update data storing medium 8 is removably attached to the car navigation terminal 5a, and the external map update data update terminal 31 can rewrite the map update data on the map update data storing medium 8 by the data collected from the map update data provider 32 via the Internet 33, or from the map update data recording medium 34. This offers an advantage of being able to increase the number of choices of update processing of the map update data on the map update data storing medium 8, which is particularly effective when the volume of the broadcast map update data is enormous.

EMBODIMENT 3

Although in the foregoing embodiments 1 and 2, the map update data delivery equipment 1 broadcasts only the map update data by radio waves, the system of the present embodiment 3 is configured such that all the latest data blocks of the entire map (latest map data in its entirety) are always broadcast, and the car navigation terminal side receives all the map area data blocks, selects only map area data blocks it requires, and stores them.

More specifically, the map update data management server 3 is used as a map data management section for managing all the latest map data; the map update data broadcasting section 4 is used as a map data broadcasting section for broadcasting by radio waves all the latest map data managed by the map data management section; and the map update data delivery equipment 1 is used as map data delivery equipment.

On the other hand, the configuration of the car navigation terminals 5a–5c is equivalent to that of the foregoing embodiments 1 and 2.

Next, the operation of the present embodiment 3 will be described.

The operation different from the foregoing embodiments 1 and 2 will be chiefly described. In the present embodiment 3, the entire map data broadcasting section broadcasts all the latest map data by radio waves. The operation of the car navigation terminals 5a–5c is the same as that of the foregoing embodiments 1 and 2. That is, the broadcast data receiver 6 receives the broadcast map data; the received data processor 7 makes a decision as to whether the received map data is recorded or not on the map update data storing medium 8 or on the map data recording medium 10, and when the received map data is recorded thereon, as to whether the data is to be updated or not; and adds the received map data to or substitutes the received map data for the map data on the map update data storing medium 8 so that the data stored in the map update data storing medium 8 and map data recording medium 10 can be used.

Thus, according to the present embodiment 3, the map data broadcasting section 4 in the map update data delivery equipment 1 delivers all the latest map data. This offers an advantage similar to that of the embodiments 1 and 2 without changing the configuration of the car navigation terminals 5a–5c.

Although in the foregoing embodiments 1–3, all the map data blocks, which are not written on the map update data storing medium 8 or on the map data recording medium 10, and all the map update data blocks which are written on the map update data storing medium 8 but are revised to new data, are stored or updated on the map update data storing medium 8, this is not essential. For example, the map update data blocks selected by a user through the car navigation terminals 5a–5c can be newly stored or updated.

More specifically, every time new map update data blocks to be stored or updated are received, the display unit 13 in the terminal displays the area numbers and/or areas of the received data blocks. The user can decide the necessity of each of the map update data blocks, or can register in advance the area numbers to be updated to the received data processor 7 so that the unnecessary map area data blocks are discarded. This makes it possible for the user who requires the map data update of only a particular area such as Hokkaido to discard the data of the other areas such as Honshu or Kyushu in Japan. This offers an advantage of being able to avoid the download of unnecessary map update data, thereby reducing the memory capacity of the map update data storing medium 8.

Furthermore, although the car navigation terminals 5a–5c each comprise the map update data storing medium 8 and the map data recording medium 10 in the foregoing embodiments 1–3, when the map data broadcasting section in the map update data delivery equipment 1 delivers all the latest map data, the map data recording medium 10 can be removed with leaving only the map update data storing medium 8. In this case, the map update data storing medium 8 can store all the latest map data delivered from the map data broadcasting section in the map update data delivery equipment 1. Alternatively, as described above, every time the map update data blocks to be newly stored or updated are received, the display unit 13 of the terminal can display the area numbers and/or areas of the data blocks so that the user can select the necessary map update data, or can register in advance to the received data processor 7 the areas or area numbers of the areas to be newly recorded or updated, thereby preventing the data blocks of the other areas from being stored or updated. This makes it possible not only to obviate the map data recording medium 10, but also for the user who requires only the map data of Hokkaido not to download the map data of the other areas like Honshu or Kyushu even when they are delivered, thereby being able to reduce the memory capacity of the map update data storing medium 8.

What is claimed is:

1. A car navigation map update system comprising:

map update data delivery equipment including a map update data management section for managing a database containing rewritable map data, and a map update data broadcasting section for broadcasting map update data rewritten by the map update data management section;

a car navigation terminal that receives the map update data broadcast by said map update data delivery equipment, stores the map update data in a map update data storing medium, and utilizes the map update data stored in the map update data storing medium in connection with map information data stored in a map data recording medium to form at least a partial map;

said car navigation terminal forms an entire map by assembling partial map areas that are small subdivisions of map areas, and update the map on a partial map area basis by attaching an area identifier and a version number to each of the partial map areas; and wherein said car navigation terminal comprises a received data processor, and said received data processor compares the area identifiers and version numbers of the received map update data with those of the map information data stored in the map data recording medium and with those of the map update data stored in the map update data storing medium; additionally stores a received map update data block into the map update data storing medium, when the received map update data block has a version number that is newer than that of a corresponding map information data block stored in the map data recording medium, and has an area identifier that disagrees with area identifiers of all map update data blocks on the map update data storing medium, and rewrites a map update data block on the map update data storing medium by a newly received map update data block, when the received map update data block has area identifier that agrees with that of the map update data block stored in the map update data storing medium, and has version number that is newer than that of the map update data block stored in the map update data storing medium.

2. The car navigation map update system according to claim 1, wherein said car navigation terminal comprises a map generator, and wherein said map generator retrieves map update data and map information data associated with designated map areas from said map update data storing medium and from said map data recording medium, and generates map data with replacing the map information data by the map update data in the designated map areas.

3. The car navigation map update system according to claim 1, wherein said map update data broadcasting section broadcasts the map update data repeatedly.

4. The car navigation map update system according to claim 1, further comprising a map update data update terminal, wherein said map update data storing medium is removably attached to said car navigation terminal, and the map update data update terminal rewrites the map update data on the map update data storing medium.

5. The car navigation map update system according to claim 1, wherein said map update data delivery equipment comprises instead of said map update data broadcasting section an entire map data broadcasting section for broadcasting all latest map data managed by said map data management section.

6. A car navigation terminal comprising:

a map information data recorder for recording map data in a map data recording medium in advance;

a receiver for receiving map update data broadcast by radio waves;

a map update data storage for storing map update data;

a map generator for combining map information data recorded in said map data recording medium with the map update data stored in said map update data storage;

a display unit for displaying combined map data; and wherein said car navigation terminal comprises a received data processor, and wherein said received data processor compares the area identifiers and version numbers of the received map update data with those of the map information data stored in the map data recording medium and with those of the map update data stored in the map update data storage; additionally stores a received map update data block into the map update data storage, when the received map update data block has a version number that is newer than that of a corresponding map information data block stored in the map data recording medium, and has area identifier that disagrees with area identifiers of all map update data blocks on the map update data storage, and rewrites a map update data block on the map update data storage by the newly received map update data block, when the received map update data block has area identifier that agrees with that of a map update data block stored in the map update data storage, and has version number that is newer than that of the map update data block stored in the map update data storage.

7. A method for updating a navigation map in a vehicle comprising:

managing a database containing rewritable map data so as to rewrite map update data, broadcasting the rewritten map update data to a vehicle navigation terminal, storing the broadcast map update data in a map update data storing medium, forming at least a partial map using the stored map update data in connection with map information data stored in a map data recording medium, assembling at least two partial map areas that are small subdivisions of map areas to form an entire map, updating the entire map on a partial map area basis by attaching an area identifier and version number to each of the partial map areas, comparing the area identifiers and the version numbers associated with the received map update data with the area identifiers and version numbers associated with the map information data and the area identifiers and version numbers associated with the stored map update data, storing the received map update data into the map update data storing medium if the received map update data includes a map update data block whose version number is newer than that of a corresponding map information data block stored in the map data recording medium and whose area identifier disagrees with the area identifiers of all map update data blocks on the map update data storing medium, and rewriting a map update block on the map update data storing medium using the received map update data if the received map update data includes a map update data block whose area identifier agrees with that of the map update data block stored in the map update data storing medium and whose version number is newer than that of the map update data stored in the map update data storing medium.

8. The method according to claim 7, further comprising:

retrieving map update data and map information data associated with designated map areas from the map update data storing medium and from the map data recording medium, and generating map data by replacing the map information data by the map update data in the designated map areas.

9. The method according to claim 7, wherein the step of broadcasting further includes broadcasting the map update data repeatedly.

10. The method according to claim 7, wherein the map update data storing medium is removably attached, the method for rewriting a map update data block comprising rewriting the map update data block on the removably attached map update data storing medium.

11. The method according to claim 7, wherein the step of broadcasting further includes broadcasting all latest map data managed during map data management.

12. A method for providing navigation in a vehicle, the method comprising:

recording map information data in advance in a map data recording medium, managing a database containing rewritable map data so as to rewrite map update data, broadcasting the rewritten map update data to a vehicle navigation terminal, receiving the broadcast map update data, storing the received map update data in a map update data storing medium, forming at least a partial map using the stored map update data in connection with map information data stored in the map data recording medium, assembling at least two partial map areas that are small subdivisions of map areas to form an entire map, updating the entire map on a partial map area basis by attaching an area identifier and version number to each of the partial map areas, comparing the area identifiers and the version numbers associated with the received map update data with the area identifiers and version numbers associated with the map information data and the area identifiers and version numbers associated with the stored map update data in the map update data storing medium, storing the received map update data into the map update data storing medium if the received map update data includes a map update data block whose version number is newer than that of a corresponding map information data block stored in the map data recording medium and whose area identifier disagrees with the area identifiers of all map update data blocks on the map update data storing medium, and rewriting a map update block on the map update data storing medium using the received map update data if the received map update data includes a map update data block whose area identifier agrees with that of a map update data block stored in the map update data storing medium and whose version number is newer than that of the map update data stored in the map update data storing medium.

* * * * *